United States Patent

Kato et al.

[11] Patent Number: 5,956,459
[45] Date of Patent: Sep. 21, 1999

[54] KARAOKE APPARATUS HAVING VIDEO MIXER OF MAIN AND INSERT PICTURES

[75] Inventors: Hirokazu Kato; Minoru Ogita, both of Hamamatsu; Hiroshi Mino, Tokyo, all of Japan

[73] Assignee: Yamaha Corporation, Hamamatsu, Japan

[21] Appl. No.: 08/922,740

[22] Filed: Sep. 3, 1997

Related U.S. Application Data

[63] Continuation of application No. 08/413,336, Mar. 30, 1995, abandoned.

[30] Foreign Application Priority Data

Mar. 31, 1994 [JP] Japan .................................. 6-062567

[51] Int. Cl.⁶ ........................... H04N 5/91; H04N 5/928; H04N 7/04; H04N 7/06
[52] U.S. Cl. .................................................. 386/95
[58] Field of Search ................... 386/39, 45, 95, 386/96, 104, 105, 106, 125, 126; 348/584, 586, 588, 598, 600

[56] References Cited

U.S. PATENT DOCUMENTS

| 4,305,131 | 12/1981 | Best | 364/521 |
|---|---|---|---|
| 5,144,454 | 9/1992 | Cury | 358/335 |
| 5,151,793 | 9/1992 | Ito et al. | 358/335 |
| 5,187,589 | 2/1993 | Kono et al. | 358/335 |
| 5,243,582 | 9/1993 | Yamauchi et al. | 369/32 |
| 5,247,126 | 9/1993 | Okamura et al. | 84/609 |
| 5,250,747 | 10/1993 | Tsumura | 84/645 |
| 5,446,714 | 8/1995 | Yoshio et al. | 369/48 |
| 5,489,103 | 2/1996 | Okamoto | 273/443 |

FOREIGN PATENT DOCUMENTS

| 0473043 | 3/1992 | European Pat. Off. . |
|---|---|---|
| 6102888 | 4/1994 | Japan . |
| 2271461 | 4/1994 | United Kingdom . |

OTHER PUBLICATIONS

U.K. search report, dated May 5, 1995, Appl. No. GB 9506450.7.

*Primary Examiner*—Douglas W. Olms
*Assistant Examiner*—David R. Vincent
*Attorney, Agent, or Firm*—Pillsbury Madison & Sutro LLP

[57] ABSTRACT

A karaoke apparatus is provided with a first storage for storing a plurality of karaoke data files corresponding to a plurality of karaoke songs and containing an accompaniment data and a picture index data, a second storage for storing a plurality of primary pictures, and a third storage for storing a plurality of secondary pictures which are mixed to the primary pictures. Upon requesting a desired karaoke song to select the corresponding karaoke data file, particular ones of the primary pictures and the secondary pictures are retrieved from the second and third storages according to the picture index data contained in the selected karaoke data file. A video mixer operates for mixing the retrieved secondary picture to the retrieved primary picture to synthesize a composite picture which meets a mood of the requested karaoke song. A tone generator operates according to the accompaniment data contained in the selected karaoke data file to sound an instrumental accompaniment of the requested karaoke song. A monitor displays the composite picture in synchronization with the instrumental accompaniment so as to present a background screen of the performed karaoke song.

7 Claims, 4 Drawing Sheets

Music data file

| Header (Including genre data |
|---|
| Pereformance data track |
| Word track |
| Seconary picture track |

Secondary picture track

| dt | Hint | dT |
|---|---|---|
| dt | Hint | dT |
| dt | Hint | dT |

CD-ROM Picture data format

Picture data index table

| Chapter 1 | Content |
|---|---|
| Chapter 2 | Content |
| Chapter 3 | Content |
| Chapter 4 | Content |

KARAOKE APPARATUS HAVING VIDEO MIXER OF MAIN AND INSERT PICTURES

This is a continuation of application Ser. No. 08/413,336 filed Mar. 30, 1995, now abandoned.

BACKGROUND OF THE INVENTION

The present invention relates to a karaoke apparatus which mixes a plurality of pictures to compose a background video (BGV) in synchronization with performance of a requested karaoke song.

In a karaoke apparatus, lyric words are displayed in matching with the performance of a music, and further, for enhancing an atmosphere or mood of the music, background pictures are reproduced and displayed simultaneously with the music performance as BGV. However, a volume of picture data of BGV for one musical composition is very large. If BGV is prepared for each of entry karaoke songs of some hundreds to thousands of musical compositions, a storage device having a very great capacity is required. In view of this, the practical karaoke system is constructed such that only coded data for synthesizing music sounds and lyric words are stored in a karaoke data file. On the other hand, picture data of several BGV scenes are separately stored therefrom and one scene is selected according to a proper rule, and is reproduced and displayed.

However, in this karaoke apparatus, the number of the BGV scenes is limited as compared with the number of the musical compositions of the entry karaoke songs. Therefore, the same BGV scene may be incidentally reproduced when different karaoke songs are played so that users may lose interest. Further, in the conventional karaoke apparatus of this type, since general and static pictures may be commonly used as the BGV scenes of any entry karaoke songs, effects for enhancing a mood of the music are not expected so much.

SUMMARY OF THE INVENTION

It is an object of the present invention to provide a karaoke apparatus, wherein picture data are read out from a plurality of separate picture data storage devices to synthesize a composite picture data so that a significantly great number of the BGV scenes can be presented with a limited picture data resource.

According to the invention, a karaoke apparatus comprises file storing means for storing a plurality of music data files corresponding to a plurality of karaoke songs and containing a performance data, a word data and a picture designation data, requesting means for requesting a desired karaoke song to select a corresponding music data file, music performing means for performing the requested karaoke song based on the performance data contained in the selected music data file, primary picture storing means for storing a plurality of primary picture data which represent a plurality of primary pictures, secondary picture storing means for storing a plurality of secondary picture data which represent a plurality of secondary pictures which are inserted into the primary pictures, picture data reading means for reading out designated ones of the primary picture data and the secondary picture data from the primary picture storing means and the secondary picture storing means, respectively, according to the picture designation data which is contained in the selected music data file, picture synthesizing means for mixing the read secondary picture data with the read primary picture data to synthesize a composite picture data, and display means receptive of the composite picture data and the word data for displaying a composite picture which is a mixture of the designated primary picture and the designated secondary picture in superposed relation to lyric characters specified by the word data in synchronization with progression of the performed karaoke song. In a specific form, the picture data reading means comprises means operative according to the picture designation data for designating a single of primary picture data and a multiple of secondary picture data which are time-sequentially mixed to the single primary picture data.

In a somewhat different form, the inventive karaoke apparatus comprises first storage means for storing a plurality of karaoke data files corresponding to a plurality of karaoke songs and containing an accompaniment data and a picture index data, second storage means for storing a plurality of primary pictures, third storage means for storing a plurality of secondary pictures which are mixed to the primary pictures, requesting means for requesting a desired karaoke song to select the corresponding karaoke data file, retrieving means for retrieving particular ones of the primary pictures and the secondary pictures from the second and third storage means according to the picture index data contained in the selected karaoke data file, synthesizing means for mixing the retrieved secondary picture to the retrieved primary picture to synthesize a composite picture which meets a mood of the requested karaoke song, sound means operative according to the accompaniment data contained in the selected karaoke data file to sound an instrumental accompaniment of the requested karaoke song, and display means for displaying the composite picture in synchronization with the instrumental accompaniment so as to present a background screen of the karaoke song.

In the karaoke apparatus according to the present invention, the file storing means stores a plurality of the music data files, and one of them is selected by the requesting means. Based on the music data file selected by the requesting means, the music sounds and lyric words are synthesized to perform the karaoke song and to display the lyric characters. Further, the picture designation data is picked up from the music data file. Based on the picture designation data, the primary picture data and the secondary picture data are read out from the primary picture storing means and the secondary picture storing means, respectively. The read-out primary or main picture data and the secondary or insertion picture data are mixed to each other by the synthesizing means to compose one composite picture data as a BGV scene. Since the main picture data is selected based on the picture designation data contained in the music data file, and further, the insertion picture data is mixed with the main picture data, the BGV scene suitable for the requested karaoke song can be derived from limited picture data resources in diverse variations. Moreover, the picture designation data designates a multiple of the secondary picture data in time sequence in matching with progression of the karaoke song performance. Accordingly, by selecting the secondary picture data in time sequence based on such a picture designation data, a plurality of the secondary picture data are inserted into the primary picture data according to the progression of the music so that the composite picture data can be synthesized so as to match the mood of the music.

DETAILED DESCRIPTION OF INVENTION

Figure 1:
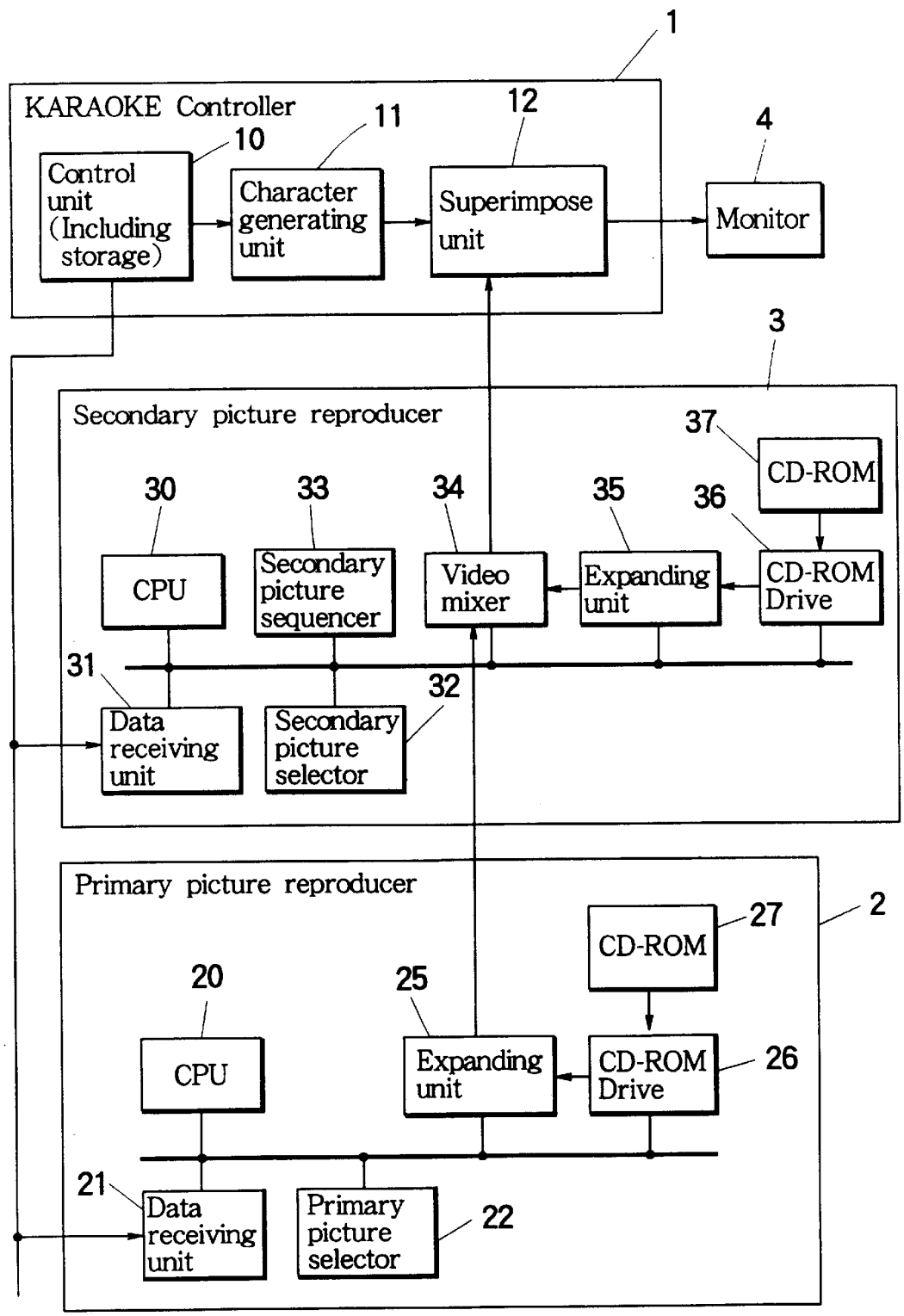
FIG. 1 is a block diagram of a karaoke system as an embodiment of the present invention.

FIG. 1 is a block diagram showing a structure of a karaoke system according to an embodiment of the present invention. The karaoke system is composed of a karaoke controller 1, a primary picture reproducer 2 and a secondary picture reproducer 3. In this karaoke system, when a user requests a karaoke music song, the karaoke controller 1 produces an accompaniment sound (karaoke sound) and a lyric word of the requested song, and composes a BGV scene based on picture data read out from both of the primary picture reproducer 2 and the secondary picture reproducer 3. The foregoing lyric word is displayed in superimposed relation to the BGV scene. Here, a primary picture reproduced by the primary picture reproducer 2 constitutes a base of the BGV displayed from the top to end of the music song, and corresponds to a main picture data. Secondary pictures reproduced by the secondary picture reproducer 3 are intermittently inserted into and mixed to the primary picture to additionally enhance an atmosphere of BGV, and correspond to an insertion picture data. The primary picture data, for example, represents "harbor" and "seashore" which can be used generally as BGV for any karaoke music song. The secondary picture data represents specific pictures, such as, "gull", "yacht" and "original singer portrait", and is selectively combined to match with atmospheres of respective musical compositions of the karaoke songs. By synthesizing these primary and secondary pictures with each other, it is possible to form composite pictures where gulls fly in the harbor or the singer oneself visits the harbor on a display screen.

The karaoke controller 1 controls the entirety of the karaoke system. The karaoke controller 1 has a control unit 10 which includes a first storage storing a plurality of music data files or karaoke data files corresponding to a plurality of entry karaoke songs. Further, although not shown, a sound source, a microphone, a speaker and the like are connected to the control unit 10 so as to output a live singing voice and an instrumental accompaniment sound from the speaker based on a performance data of a music song requested by the user. Further, the control unit 10 sends to a word superimpose producing section including a character generator 11 a word sequence data which is synchronous with the accompaniment. Further, the control unit 10 sends a picture designation data or index data composed of a genre data at a header and a sequence data at a secondary picture track included in the music data file of the requested or selected music song, to the primary picture reproducer 2 and the secondary picture reproducer 3, respectively.

Here, a structure of the music data file stored in the control unit 10 will be described referring to FIG. 2A. In the control unit 10, music data files of some hundreds to thousands of musical compositions are stored, and one of them is selected by request of the user via, such as, a remote controller. As shown in the figure, the music data file of one musical composition is formed of a header, a performance data track, a word track and a secondary picture track. The header includes a genre data which represents a kind of the musical composition and its mood or atmosphere besides a title of the musical composition of the karaoke song and its performance time. As described above, the genre data generally indicates the genre and the seasonal mood of the musical composition, such as, "popular ballad, winter". Based on the genre data, the primary picture is selected. On the performance data track, a performance data or an accompaniment data of a karaoke song is written in the form of a sequence data for generating musical sounds. The performance data is inputted into a sound source circuit (not shown) connected to the control unit 10. Based on the performance data, the sound source circuit or tone generating circuit produces a musical sound signal having a given tone level and a given tone quality. The performance data may be stored in the form of MIDI data. On the word track, a character code data or word data is stored to present lyric words which are displayed on a monitor 4 in synchronism with the performance. The word data is a sequence data containing character codes and its display positions in the order of display timings. According to these sequence data, the lyric words can be displayed in synchronism with the performance of the requested karaoke song.

Figures 2A, 2B, 2C, 2D:
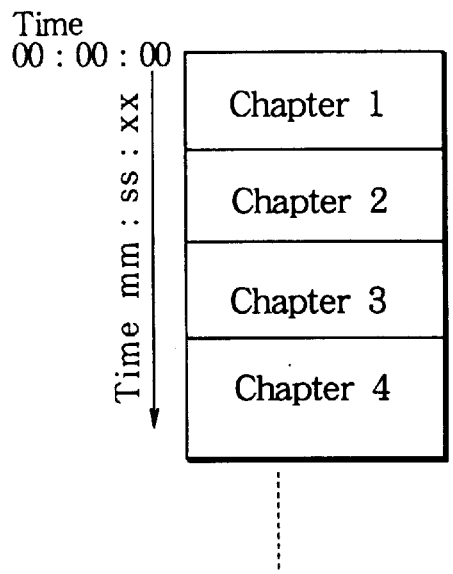
FIGS. 2A–2D are diagrams showing a structure of various kinds of data stored in the inventive karaoke system.

FIG. 2B is a diagram showing a part of the secondary picture track. As described above, the secondary picture data are intermittently inserted into the primary picture data. For reading out the secondary picture data intermittently, the secondary picture track is written with a picture index data in the form of a hint sequence data. For displaying one secondary picture, the picture index data includes a display start timing dt, a hint data Hint indicative of display contents, and a display time dT. Besides them, a display position data and an additional data instructing fade-in and fade-out can also be included. By reading out these sequence data in order via a secondary picture sequencer 33 in the secondary picture reproducer 3, the secondary picture data are mixed with the primary picture data and displayed.

Referring back to FIG. 1, the primary picture reproducer 2 has a data receiving unit 21 for receiving the genre data sent from the control unit 10. The data receiving unit 21 is connected to a bus, which connects to a CPU 20, a primary picture selector 22, a compression releasing unit or an expanding unit 25 and a CD-ROM drive 26. On the other hand, compressed primary picture data are inputted into the compression releasing unit 25 from the CD-ROM drive 26. In the CD-ROM drive 26, one or more of CD-ROM 27 is set. The CD-ROM 27 stores the picture data which can be the primary picture of the karaoke song in the format shown in FIG. 2C, containing a plurality of scenes a chapter by chapter basis. For storing a great volume of the picture data in the CD-ROM 27, the respective picture data are compressed. The picture data are representative of the primary pictures which can be used for the general BGV, such as, "harbor" and "seashore" as described above. The static primary picture has a reproduction time of no less than 3–4 minutes, since they are continuously displayed throughout the music performance. A table data representing contents of the primary pictures of the respective chapters in the CD-ROM 27 are stored in the primary picture selector 22 in the form of a picture data index table (FIG. 2D). The genre data sent from the control unit 10 of the karaoke main body is inputted into the primary picture selector 22 via the data receiving unit 21 under the control of the CPU 20. The primary picture selector 22 determines based on the genre data as to which of the primary picture data is to be reproduced. The genre data suggests an item of a suitable primary picture, such as, "popular ballad, winter" which can be a hint for selecting the primary picture data. The primary picture selector 22 refers to the foregoing picture data index table using the genre data so as to determine the primary picture data in terms of a chapter number.

The chapter number determined by the primary picture selector 22 is inputted into the CD-ROM drive 26. The CD-ROM drive 26 accesses the CD-ROM 27 using the inputted chapter number, and reproduces the selected primary picture data. The read-out picture data is inputted into the compression releasing unit 25 from the CD-ROM drive 26. The compression releasing unit 25 releases the compression of the inputted picture data for decoding the same into a normal video signal. The decoded video signal is outputted to a video mixer 34 of the secondary picture reproducer 3.

The secondary picture reproducer 3 has a data receiving unit 31 for receiving the picture designation data in the form of the secondary picture sequence data sent from the control unit 10. The data receiving unit 31 is connected to a bus, which connects to a CPU 30, a secondary picture selector 32, the secondary picture sequencer 33, the video mixer 34, a compression releasing unit or an expanding unit 35 and a CD-ROM drive 36. On the other hand, a compressed secondary picture data is inputted into the compression releasing unit 35 from the CD-ROM drive 36. In the CD-ROM drive 36, one or more of CD-ROM 37 is set. The CD-ROM 37 stores the picture data which represents the secondary picture of the karaoke song in a compressed manner in the form of a plurality of scenes. The picture data representative of the secondary picture is a specific picture data, such as, "gull", "yacht" and "original singer portrait" as mentioned before. The picture data can represent not only a dynamic picture but also a static picture. A table data representing contents of the secondary picture data in the CD-ROM 37 is stored in the secondary picture selector 32 in the form of a picture data index table (FIG. 2D). The secondary picture designation sequence data sent from the control unit 10 of the karaoke controller 1 is inputted into the secondary picture sequencer 33 via the data receiving unit 31 under the control of the CPU 30. The secondary picture designation sequence data has a structure shown in FIG. 2B. The secondary picture sequencer 33 reads out the sequence data in order simultaneously with the start of the karaoke performance. The secondary picture sequencer 33 inputs the hint data contained in the sequence data into the secondary picture selector 32, and outputs the reproduction time data dT to the CD-ROM drive 36. The secondary picture selector 32 determines based on the inputted hint data and the picture data index table as to which of the secondary picture data is to be reproduced. The display of the secondary picture continues only about several seconds to one minute. Accordingly, it is not necessarily required to reproduce from the top of the chapter so that an intermediate timing in the chapter may be designated to start the reproduction from that position. By this, repeat of the same reproduced scenes can be eliminated, and the scene which more matches with the music can be selected diversely even from one chapter. The timing data at determined by the secondary picture selector 32 is inputted into the CD-ROM drive 36. The CD-ROM drive 36 accesses the CD-ROM 37 using the inputted timing data so as to reproduce a given secondary picture data. Since these picture data are compressed, the secondary picture data are inputted into the compression releasing unit 35 where the compression is released. The secondary picture data of which the compression has been released is decoded into a normal video signal, which is inputted into the video mixer 34. In the video mixer 34, the primary picture data inputted from the primary picture reproducer 2 and the secondary picture data are mixed with each other. As a general synthesizing method, there is available a method in which an extraneous portion of the secondary picture other than an object of "gull" or "singer portrait" is turned to a blue back and the primary picture is fitted in the blue back portion so as to synthesize a composite picture. However, the synthesizing method is not limited to this method. The composite picture data synthesized by the video mixer 34 is inputted into a superimpose unit 12.

In the karaoke controller 1, the character generating unit 11 is connected to the superimpose unit 12. The character generating unit 11 is a circuit for producing a character data of the lyric words based on the word sequence data inputted from the control unit 10 at the time of the karaoke performance. As described above, the word sequence data is a data string formed of, such as, the character codes, the positional data for displaying the characters, and the display timings. By reading out the word sequence data in order so as to develop a character pattern of the lyric words on the screen, the words are displayed in synchronization with progression of the music. Further, by changing a color designation in sequence, a display color tone of the words can also be changed in synchronization with progression of the song. In the superimpose unit 12, the word characters are superimposed over the composite picture inputted from the video mixer 34. By inputting these picture data into the monitor 4, a background video (BGV) scene is displayed closely to meet the mood of the karaoke musical composition, and further, the word display in matching with progress of the karaoke musical composition is performed.

Figure 3A:
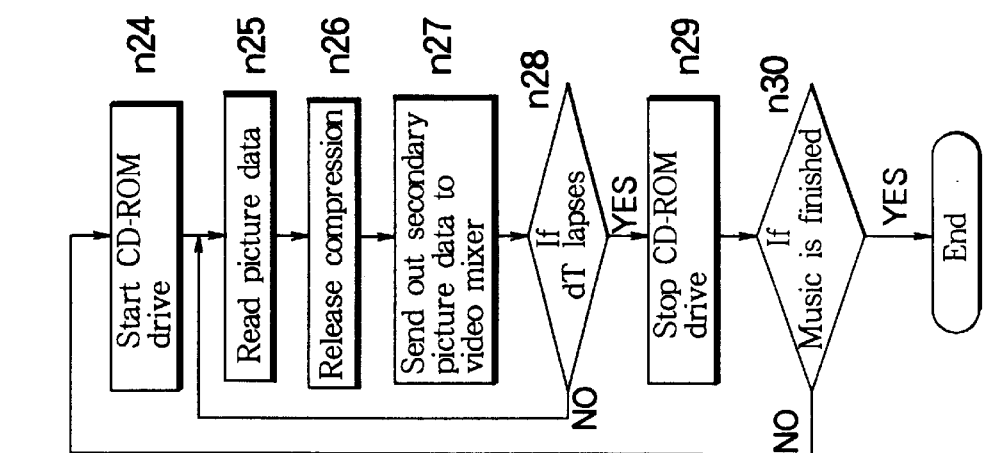
FIGS. 3A–3C are flowcharts showing operations of the inventive karaoke system.
Figure 3B:
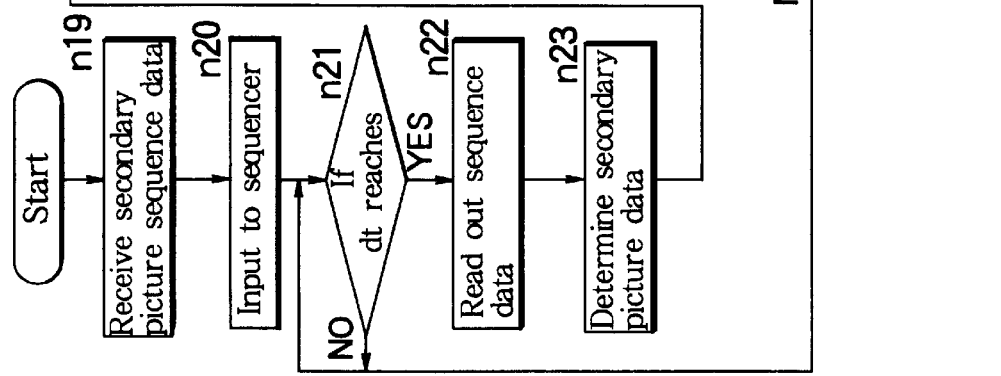
Figure 3C:
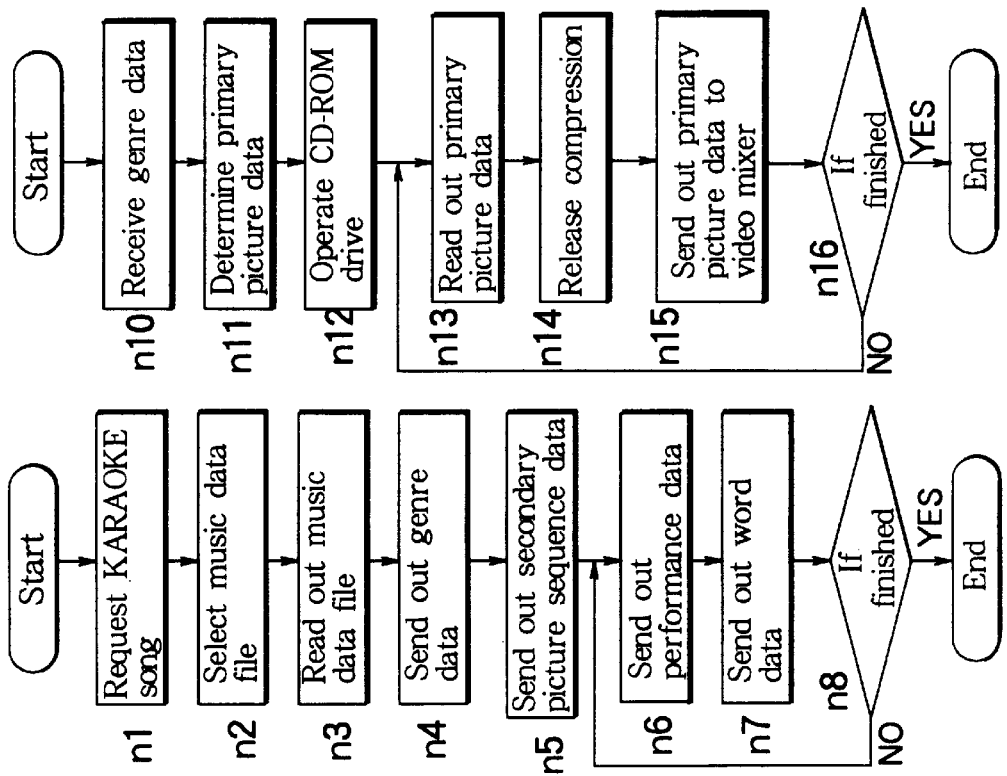

The karaoke system as constructed above performs operations as shown in FIGS. 3A–3C depending on a request of karaoke music by the user. Further, depending on the operation, the screen display is performed on the monitor 4 in a sequence shown in FIG. 4. Here, FIG. 3A is a flowchart showing operation of the karaoke controller 1, FIG. 3B is a flowchart showing operation of the primary picture reproducer 2, and FIG. 3C is a flowchart showing operation of the secondary picture reproducer 3.

In FIG. 3A, when a desired musical composition is requested by the user operation with the remote controller or else (n1), the control unit 10 selects the music data file of the requested musical composition from the main storage (n2). The selected music data file is read out (n3), the genre data included in the header of the music data file is sent to the primary picture reproducer 2 (n4), and further, the secondary picture sequence data on the secondary picture track is sent to the secondary picture reproducer 3 (n5). Thereafter, the performance data and the word data are read out from the performance data track and the word track in order from the music data file, and are sent to the sound source circuit and the word character generating unit 11 (n6, n7). These operations are continued until the end of the music, and then finished (n8).

In FIG. 3B, when the primary picture reproducer 2 receives the genre data from the karaoke controller 1 (n10), it is detected that the karaoke performance is started, and the genre data is inputted into the primary picture selector 22 to determine the chapter number of the primary picture data (n11). The chapter number is fed to the CD-ROM drive 26 (n12) to read out the primary picture data (n13). After the compression of the read-out picture data is released at the compression releasing unit 25 (n14), the primary picture data is outputted to the video mixer 34 (n15). The operations after step n13 are continued until the end of the music (n16), and then finished by the termination of the music.

In FIG. 3C, when the secondary picture reproducer 3 receives the secondary picture designation sequence data from the karaoke controller 1 (n20), it is determined that the karaoke performance is started, and the sequence data is inputted into the secondary picture sequencer 33 (n20). The sequencer 33 counts a time from the start of the karaoke performance. When the counted time reaches a preset dt (n21), the sequencer 33 reads out the sequence data because it is the display timing of the secondary picture data (n22). Then, the sequencer 33 inputs the hint data into the secondary picture selector 32 to determine the secondary picture data in terms of a timing data or address data of the CD-ROM (n23). The timing data is fed to the CD-ROM drive 36 (n24) to read out the secondary picture data (n25). After the compression of the read-out picture data is released at the compression releasing unit 35 (n26), the secondary picture data is outputted to the video mixer 34 (n27). The operations after step n25 are continued until lapse of the display time or duration dT of the secondary picture data (n28). When dT lapses, the CD-ROM drive 36 is controlled to stop the reading of the picture data (n29). Thereafter, when the music is not finished, the process returns to step n21 and awaits a timing of the next sequence data (n30). When the music is finished, the operations are finished accordingly. In the foregoing operations, the timing data dt contained in the secondary picture sequence data is all processed as a serial time data measured from the start of the music. On the other hand, the data dt may be set as a time interval between adjacent display events of different secondary pictures. In this case, an internal timer may be reset at every display timing.

Figure 4:
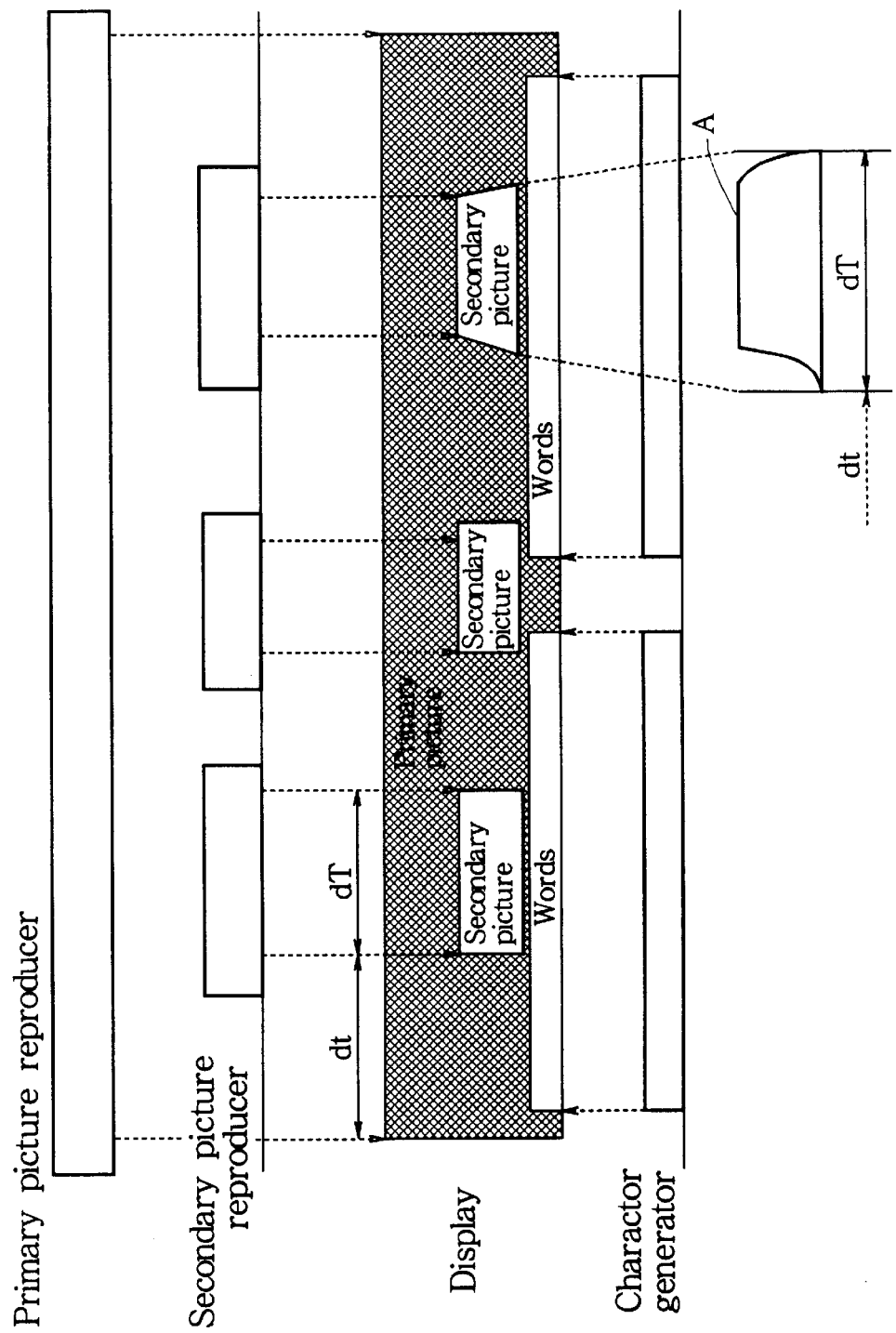
FIG. 4 is a diagram for explaining a display sequence of a monitor provided in the inventive karaoke system.

According to the foregoing operations, the screen display is performed in the sequence as shown in FIG. 4. First, the primary picture reproducer 2 reproduces the separate primary picture which is alone displayed on the monitor 4. Subsequently, when an introduction part of the karaoke song is finished and a body of the song is started, the character generator 11 produces the lyric word superimpose in matching with progression of the song, and the lyric word is displayed on the monitor 4 as being superimposed on the foregoing primary picture. Further, when the secondary picture reproducer 3 reproduces the secondary picture data according to the secondary picture designation sequence data, the secondary picture is reproduced and mixed with the primary picture. The secondary picture reproducer 3, in consideration of a lead time required for stable operation of the CD-ROM drive 36, starts to drive the CD-ROM 37 slightly before the reproduction start timing dt. When the dt is reached, the secondary picture reproducer 3 reads out the picture data from the CD-ROM 37 for outputting the same to the video mixer 34 via the compression releasing unit 35. Further, after the reproduction finishing timing is reached and the output of the picture data is stopped, the driving of the CD-ROM 37 is stopped. This aims to eliminate the disturbance of the picture at the time of starting and stopping of the CD-ROM drive. Further, the secondary picture data can be inserted into the primary picture data in fade-in and fade-out manners. In this case, the fade-in and fade-out are performed such that the fade-in is started at the display start timing dt and the fade-out is finished at the termination of the display duration dT as indicated by curve A.

As described above, in this embodiment, by using the primary picture reproducer 2 and the secondary picture reproducer 3, the primary picture is continuously displayed throughout the music while the secondary picture is intermittently inserted into the foregoing primary picture. A general picture suitable for the karaoke music can be used as the primary picture, and a specific picture more suitable for the requested karaoke music can be integrated to the primary picture as the secondary picture. By this, a BGV scene which is specialized to an image of the music can be produced with a limited resource of the picture data.

The selection or designation operations of the picture selectors 22, 32 are not limited to the method where one picture data is selected by referring to the index table based on the genre and hint data. Derivation may be performed using the hint data as the key data so as to select a proper picture data. Anyway, the hint data is preset in the music data file so that the picture selector selects one of the stored picture data by itself depending on the hint data. Desired one of the picture data can be freely introduced into the music data files so that generalization of the data becomes possible.

Further, by storing the general scenes as the primary picture data and the specific scenes as the secondary picture data, the specific scene can be inserted into the general scene so as to produce BGV which is most suitable for an image of the music.

Further, by storing the picture data, which are classified based on different classification methods, in a plurality of picture reproducers and by synthesizing them, the variety of BGV can be produced. For example, the first picture reproducer is stored with the picture data which are classified in terms of a genre of music, such as, "popular ballad", "pop" and "folk", and the second picture reproducer is stored with the picture data which are classified in terms of season, i.e. "spring", "summer", "autumn", "winter". By combining them, the composite picture data in the form of combinations such as "popular ballad, winter" and "folk, autumn" can be composed.

In this embodiment, the selection of the primary picture data is performed based on the genre data in the form of a separate index data and the selection of the secondary picture data is performed based on the hint data in the form of a sequential hint data. However, the selections of the primary picture data and the secondary picture data may be performed based on a common designation data. In this case, one or a plurality of the secondary picture data is subordinated to the primary picture data to provide a hierarchical data structure. When the primary picture data is selected, a proper secondary picture data may be selected from those subordinated to the selected primary picture data so that accurate selection becomes possible.

Further, secondary pictures which are subjected to changes of fashion may be included in the secondary picture data, and the CD-ROM storing the secondary picture data may be replaced from old one to new one based on whether the music is in fashion or out of fashion, so as to update the BGV.

The secondary picture may be a dynamic or static picture. Further, the picture data are not limited to the compressed data. Moreover, the number of the reproducers is not limited to two. A larger number of the reproducers may be connected to raise the variety of the BGV synthesis.

In the foregoing embodiment, the picture selectors 22, 32 and the secondary picture sequencer 33 in the picture reproducers are formed by individual circuits separate from the CPU 20, 30. However, they may be replaced by the CPU 20, 30 by means of a software.

As described above, according to the present invention, by providing main picture data storing means and insertion picture data storing means and by reading out main picture data and insertion picture data and synthesizing them, a significantly great number of combinations of the composite pictures can be realized. Accordingly, though only several kinds of the picture data are stored in each picture data storing medium, by combining them, a great number of the composite pictures can be composed. By using them as the background video, the monotony of the background video can be eliminated even in the karaoke apparatus in which the music performance data and the picture data are separated from each other.

What is claimed is:

1. A karaoke apparatus comprising:

a section for storing a plurality of music data files corresponding to a plurality of karaoke songs, the music data files including performance data, word data, the word data being representative of lyric characters, and picture designation data, the picture designation data being preselected to define a composite picture and including primary picture designation data and secondary picture designation data;

a section for requesting a desired karaoke song by selecting a corresponding music data file;

a section for performing the requested karaoke song based on the performance data of the selected music data file;

a section for storing primary picture data representative of a plurality of primary pictures;

a section for storing secondary picture data representative of a plurality of secondary pictures to be integrated with the primary pictures;

a section for retrieving designated primary picture data from the section for storing primary picture data according to the primary picture designation data and designated secondary picture data from the section for storing secondary picture data according to the secondary picture designation data of the selected music data file;

a section for integrating the retrieved secondary picture data and the retrieved primary picture data to synthesize data representative of the composite picture; and a display receptive to the data representative of the composite picture and the word data for displaying a superposed composite picture, the superposed composite picture being a combination of the designated primary picture overlapped by the designated secondary picture in superposed relation to lyric characters represented by the word data of the selected music data file in synchronization with progression of the performed karaoke song, wherein the primary picture data and the secondary picture data do not include the word data and the lyric characters.

2. A karaoke apparatus according to claim 1, wherein the section for retrieving comprises a portion for designating primary picture data representative of a single primary picture and secondary picture data representative of a plurality of secondary pictures which are time-sequentially integrated with the single primary picture.

3. A karaoke apparatus comprising:

a section for storing a plurality of karaoke data files corresponding to a plurality of karaoke songs, the karaoke data files including accompaniment data, word data representative of lyric characters and picture index data;

a section for storing primary picture data representative of a plurality of primary pictures;

a section for storing secondary picture data representative of a plurality of secondary pictures which are to be integrated with the primary pictures;

a section for requesting a desired karaoke song to select a corresponding karaoke data file;

a section for retrieving primary picture data corresponding to particular ones of the primary pictures from the section for storing primary picture data and secondary picture data corresponding to ones of the secondary pictures from the section for storing secondary picture data according to the picture index data of the selected karaoke data file;

a section for integrating the retrieved secondary picture data with the retrieved primary picture data to synthesize data representative of a composite picture according to a mood of the requested karaoke song;

a section for sounding an accompaniment of the requested karaoke song based upon the accompaniment data of the selected karaoke data file; and a display responsive to the data representative of the composite picture for displaying the composite picture in synchronization with the accompaniment so as to provide a background for the requested karaoke song, the composite picture being a superposed combination of the primary picture overlapped by the secondary picture, wherein the primary picture data and the secondary picture data do not include the word data and the lyric characters.

4. A karaoke apparatus according to claim 3, wherein the display displays the lyric characters in superposed relation to the composite picture in response to the word data of the selected karaoke data file.

5. A karaoke apparatus according to claim 3, wherein the the karaoke data files further include picture index data representative of a separate index and a sequential index, wherein the section for retrieving retrieves primary picture data corresponding to one primary picture according to the separate index and retrieves secondary picture data corresponding to a plurality of secondary pictures according to the sequential index, the secondary pictures being exchangeably integrated with the one primary picture.

6. A karaoke apparatus according to claim 3, wherein each of the karaoke songs is associated with a mood and the picture index data includes genre data and hint data, wherein the section for retrieving retrieves data representative of a general primary picture according to the genre data, the general primary picture being generally associated with the mood of the requested karaoke song, and retrieves data representative of a specific secondary picture according to the hint data, the specific secondary picture being specifically associated with the mood of the requested karaoke song and being integrated with the general primary picture.

7. A karaoke apparatus according to claim 3, wherein the primary picture data includes data representative of a static primary picture and the secondary picture data includes data representative of a dynamic secondary picture, wherein the section for integrating synthesizes data representative of a superposition of a moving object of the dynamic secondary picture to a fixed background of the static primary picture.

* * * * *